United States Patent
Llorente Gonzalez et al.

(10) Patent No.: US 8,118,559 B2
(45) Date of Patent: Feb. 21, 2012

(54) LIGHTNING ARRESTER SYSTEM FOR A WIND GENERATOR BLADE

(75) Inventors: Jose Ignacio Llorente Gonzalez, Pamplona (ES); Sergio Velez Oria, Pamplona (ES)

(73) Assignee: Gamesa Innovation & Technology, S.L., Pamplona (Navarra) (ES)

(*) Notice: Subject to any disclaimer, the term of this patent is extended or adjusted under 35 U.S.C. 154(b) by 1230 days.

(21) Appl. No.: 11/792,907

(22) PCT Filed: Dec. 15, 2005

(86) PCT No.: PCT/ES2005/070176
§ 371 (c)(1), (2), (4) Date: Jun. 12, 2007

(87) PCT Pub. No.: WO2006/064077
PCT Pub. Date: Jun. 22, 2006

(65) Prior Publication Data
US 2008/0145229 A1    Jun. 19, 2008

(30) Foreign Application Priority Data
Dec. 15, 2004   (ES) .................................. 200403110

(51) Int. Cl.
*F03D 11/00* (2006.01)
*H02G 13/00* (2006.01)

(52) U.S. Cl. ....................... 416/226; 416/230

(58) Field of Classification Search .................. 416/224, 416/226, 229 R, 230, 238
See application file for complete search history.

(56) References Cited

U.S. PATENT DOCUMENTS

| | | | |
|---|---|---|---|
| 3,923,421 A * | 12/1975 | Carter et al. ................... | 416/224 |
| 6,102,662 A | 8/2000 | Bost et al. | |
| 6,126,061 A * | 10/2000 | Poggi .......................... | 228/173.1 |
| 6,457,943 B1 | 10/2002 | Olsen et al. | |
| 6,659,722 B2 * | 12/2003 | Sehgal et al. .............. | 416/134 A |
| 2006/0280613 A1 * | 12/2006 | Hansen ......................... | 416/230 |

FOREIGN PATENT DOCUMENTS

| | | |
|---|---|---|
| EP | 0 717 585 | 6/1996 |
| WO | 02/090184 | 11/2002 |
| WO | 2005/026538 | 3/2005 |
| WO | 2005/050808 | 6/2005 |

* cited by examiner

*Primary Examiner* — Nathaniel Wiehe
(74) *Attorney, Agent, or Firm* — Ladas & Parry LLP

(57) ABSTRACT

The invention relates to a lightning arrester system for wind generator blade, which replaces the standard main copper cable and which employs two strips of copper that extend along the entire length of the beam such as to be in direct contact with the carbon fibre. In this way, the carbon fibre laminate and the copper strip are always at the same potential, thereby preventing any possible arc-over between the two elements. The carbon fibre laminate is barely affected by the passage of current owing both to the electrical characteristics of the two components and to the selected configuration which conveys most of the current through the copper strips. In addition, with said novel system it is possible to position intermediate receivers on the actual laminates and in direct contact with the copper strip.

4 Claims, 2 Drawing Sheets

LIGHTNING ARRESTER SYSTEM FOR A WIND GENERATOR BLADE

SUBJECT OF THE PATENT

The subject of the patent is a lightning arrester system for transmission and reception of lightning in wind turbine blades. An important characteristic is that a part of this blade has carbon fibre laminates which have strips of copper embedded between them and which extend along the entire blade.

BACKGROUND OF THE INVENTION

The inclusion of carbon fibre in the manufacturing of wind turbine blades is quite new and although its use is fairly extensive amongst the most important companies in the sector, the experience in relation to the method used for protection against lightning is still fairly limited and there is no general knowledge of any technique for which efficacy has been demonstrated.

Both the regulations applicable to wind turbines and existing literature on the subject, speak of the an efficient method of protecting fibre glass blades against lightning consisting of a lightning arrester system based on occasional receivers located along the length of the blade and a cable which connects said receivers to the blade root and passes through its interior.

In this sense the following patent can be quoted WO 96/07825 which presents a "Lightning protection for wind turbine blades" comprised of an electrical conductor which extends from the tip of the blade travelling through the inside of the blade and ending at the blade root in a pin rod which allows the turning of the blade. The conductor will be with or without insulated covering and contributes to the support of the blade itself.

From WO 0177527 a blade is known which presents a protection against lightning with internal and external conductors, connected to each other and distributed along the whole blade. It also presents a series of penetration points and a pair of configurations for the tip and the rest of the blade.

U.S. Pat. No. 6,612,810 presents a protection whereby the blade comprises a pair of conductors extended lengthways along the surface of the blade (it also incorporates anti-ice heating elements). The blade tip has an impact receiver connected to a third conductor which runs through the inside of the blade. All conductors and heaters are connected to each other.

Existing literature on the impacts of lightning, also state the need for equipotentialising the object which will receive the impact, with the lightning arrester system. In other words, in order for all elements to be at the same potential they must be electrically connected by conductors located on the area to be protected.

Carbon fibre, as a conducting material, must be kept equipotential with the lightning arrester system. The problem with leaving conductor elements insulated is the high difference in potential which is created between them due to induction phenomena caused by the lightning when it passes through the lightning arrester system. This difference in potential may give rise to an arc-over, which could be fatal in the case which concerns us where the carbon fibre laminate constitutes the main resistant part of the blade.

There are different metal mesh based systems which attempt to prevent any intervention of the carbon fibre compound in the potential differences problem yet none of them have been shown to be efficient at resolving the problem.

DESCRIPTION

The lightning arresters system for blades with cocured strips of copper which is the subject of this invention, uses an innovative lightening protection system based on the use of strips of copper arranged lengthways along the entire blade and in direct contact with the carbon fibre laminates of said blade. This system avoids the need to use the copper cable traditionally used in lightning arrester systems for blades, therefore, the main conductor for the system becomes integrated in the blade itself, as the strips of copper have sufficient section to conduct all of the lightning current.

The strips of copper that act as the main conductor of the system, are in turn connected to receivers placed along the blades. Said intermediate receivers for the blade have an innovative design which has, until now, never been used. These intermediate receivers are placed on the carbon laminates of the blade and in direct contact with the copper strip integrated within the blade, which is responsible for discharging the lighting, and prevents the direct impact of the lightning with the carbon fibre laminates.

In the case of a lightning impact, the majority of the current circulates through the strips of copper due to the electrical characteristics of the carbon fibre laminates and strips of copper, and due to the configuration of the system itself, so that the carbon fibre laminates are hardly affected by the current.

DESCRIPTION OF A PREFERRED EMBODIMENT

One particular embodiment may consist of two strips of copper (1), each situated in contact with one of the two main carbon fibre laminates (2) of the beam (3), said laminates are arranged on both sides of the beam (3), called airfoils, and are secured facing the blade shells (4).

Figure 1:
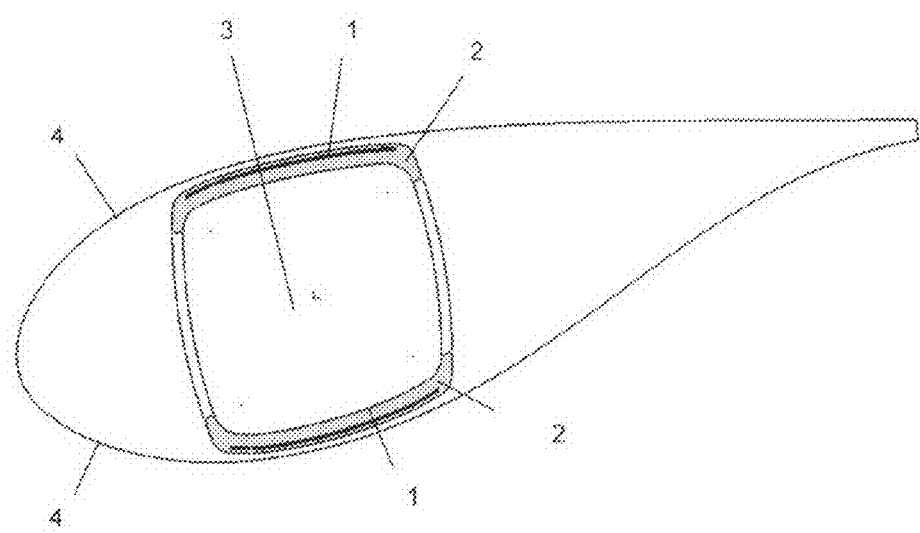
FIG. 1 shows a sketch of a transversal section of the blade which shows the arrangement of the strips of copper in relation to the carbon fibre laminates in a preferred embodiment.

As FIG. 1 shows, this system replaces the main copper cable currently used for two thin bands of copper (1) which run along the entire beam (3) in direct contact with the carbon fibre (2) so that both are equipotential, thus avoiding arc-over between said elements.

Due to the electrical characteristics of the carbon fibre laminates (2) and of the strips of copper (1), in the case of a lightning impact the majority of the current circulates through the copper strip (1) thus preventing any harm being caused to the laminates.

The copper strip (1) is located along the entire beam airfoil (3) and in direct contact with the beam's carbon fibre lami nates (2) and is covered with the subsequent layers of laminate fibre of said beam thus becoming completely integrated within it and avoiding the additional assembly of a cable on said beam, as the lightning conductor is integrated within the beam (3). The copper strip (1) has a thickness of between 0.1 and 0.4 mm, with this thickness being the minimum section to enable lightning to be conducted whilst in turn preserving the quality of the laminate within which it is integrated or to which it is adhered.

Figure 2:
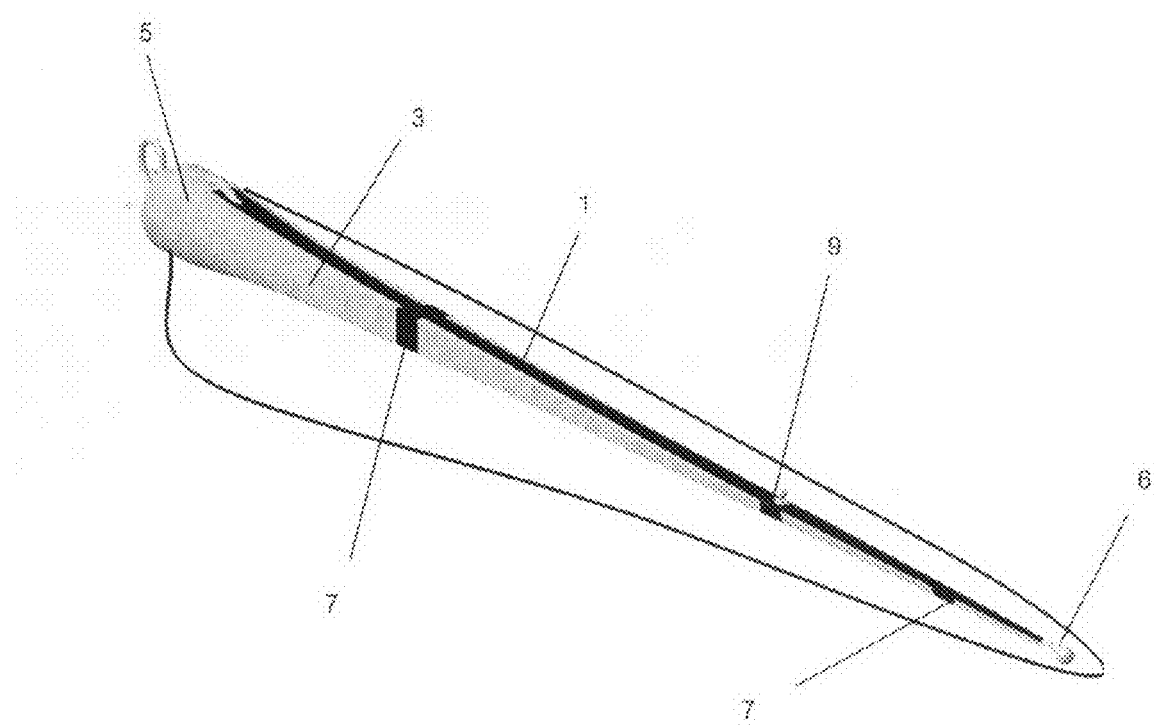
FIG. 2 shows the different elements comprising the lightning arrester system within the blade according to said preferred embodiment.

As FIG. 2 shows, the airfoils of the beam must be connected at particular sections of the beam due to the need to ensure the equal potential of both parts. These connections, which must be made at least at the root (5) and tip (6) areas, are achieved by using the same type of copper strip that is used in the lengthways direction but by placing them transversally to the beam and wrapping them around a section of the beam (3) so that it makes contact with the two main strips of copper (1), these transversal bands (7) must also be cocured with the beam (3).

The blade tip (6) incorporates a metal receiver (9) which is connected, using an additional connector, to the copper strip (1) that runs along the length of the beam (3).

The lightning arrester system subject of this invention, also has an innovative system of intermediate lightning receivers (9) for the blade which are located on the airfoils of the beam (3). These receivers (9) make direct contact with the copper strip (1) integrated within the beam (3) that is responsible for discharging the lightning, and they prevent the direct impact of the lightning with the carbon fibre laminates (2).

Figure 3:
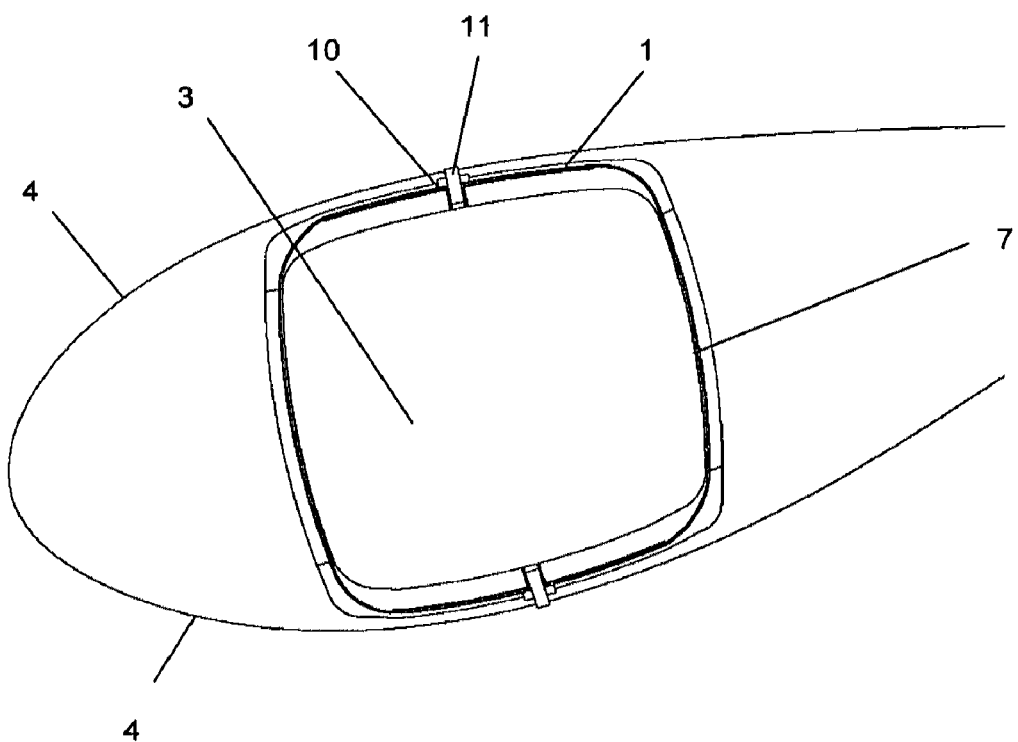
FIG. 3 shows a sketch of a transversal section of the blades at the intermediate receiver position in the case of a preferred embodiment.
Figure 4:
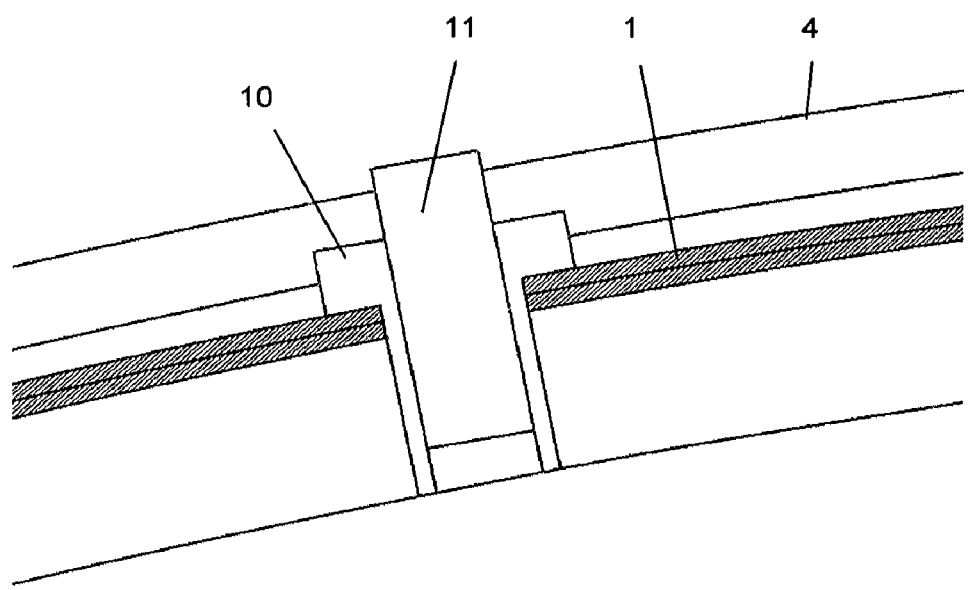
FIG. 4 shows the detail of the intermediate receiver and the elements comprising it.

As FIG. 3 shows, on the section on which the intermediate receivers (9) are placed, connection of both airfoils with the copper strip which runs transversally (7) is also recommended. The metal insert (10) rests on the copper strip (1) which runs along the entire beam airfoil (3) establishing a contact surface for equipotentialisation. Said insert (10) is secured to the carbon fibre laminates (2) and makes contact with the walls of a through bolt (11) which protrudes to the outside of the shell (4) to intercept the lightning.

The invention claimed is:

1. A lightning arrester system in a wind turbine blade comprising a beam with airfoils comprised of hybrid carbon fiber and fiberglass laminates and shells which cover upper and lower parts of the beam, comprising:
   two strips of copper which run internally along the entire length of the blade beam from a tip to a root completely integrated within the laminates of the beam of the blade and facing the blade shells;
   transversal connections which connect upper and lower bands; and
   intermediate receivers which conduct discharge from the exterior to the copper strip.

2. The lightning arrester system in a wind turbine blade according to claim 1 wherein the strips of copper are arranged along the entire beam airfoil in direct contact with the carbon fiber laminates being contained within or adhering to said laminates, covered by fiberglass layers of the beam laminates, in such a way that the strips of copper are integrated within the beam preserving the quality of the laminate, with a thickness of each of the copper strips being between 0.1 and 0.4 mm.

3. The lightning arrester system in a wind turbine blade according to claim 1, wherein the transversal connections between the strips of copper embedded in the beam airfoils are performed using strips of copper which run transversally on the beam, surrounding a section of the beam in such a manner that the beam makes contact with the main strips of copper, with said transversal band also being integrated inside the beam laminates.

4. The lightning arrester system for wind turbine blades according to claim 1, wherein said system incorporates said intermediate receivers formed by a metal insert which makes contact with the copper strip by resting upon the copper strip, secured to the carbon fibre laminate and in contact with a through bolt which protrudes to the outside of the shell preventing lightning from impacting directly on the carbon fiber laminate.

* * * * *